US008413121B2

(12) United States Patent  
Hinkley et al.

(10) Patent No.: US 8,413,121 B2  
(45) Date of Patent: Apr. 2, 2013

(54) METHOD AND SYSTEM FOR STORING TRACE EVENTS IN A DATABASE TABLE

(75) Inventors: Paul A. Hinkley, Lombard, IL (US); Charles Morrison, Dallas, TX (US)

(73) Assignee: CA, Inc., Islandia, NY (US)

( * ) Notice: Subject to any disclaimer, the term of this patent is extended or adjusted under 35 U.S.C. 154(b) by 1746 days.

(21) Appl. No.: 11/457,926

(22) Filed: Jul. 17, 2006

(65) Prior Publication Data

US 2008/0016500 A1  Jan. 17, 2008

(51) Int. Cl.
  *G06F 9/44* (2006.01)
  *G06F 9/45* (2006.01)
(52) U.S. Cl. .................. 717/128; 717/127; 717/129
(58) Field of Classification Search .......... 717/124–132, 717/140–144; 714/38; 707/E17.058
See application file for complete search history.

(56) References Cited

U.S. PATENT DOCUMENTS

| | | | |
|---|---|---|---|
| 4,723,270 A | 2/1988 | Okamoto et al. | |
| 5,287,490 A * | 2/1994 | Sites ............................ | 717/142 |
| 5,452,430 A | 9/1995 | Dievendorff et al. | |
| 5,652,889 A * | 7/1997 | Sites ............................ | 717/144 |
| 5,745,693 A * | 4/1998 | Knight et al. ................. | 709/224 |
| 5,748,878 A * | 5/1998 | Rees et al. ................. | 714/38.13 |
| 6,009,270 A * | 12/1999 | Mann ............................. | 717/128 |
| 6,182,086 B1 | 1/2001 | Lomet et al. | |
| 6,223,176 B1 * | 4/2001 | Ricard et al. ........................... | 1/1 |
| 6,282,701 B1 * | 8/2001 | Wygodny et al. ............. | 717/125 |
| 6,553,564 B1 * | 4/2003 | Alexander et al. ............ | 717/128 |
| 6,662,176 B2 | 12/2003 | Brunet | |
| 6,769,074 B2 | 7/2004 | Vaitzblit | |
| 7,043,566 B1 | 5/2006 | Grant et al. | |
| 7,058,928 B2 * | 6/2006 | Wygodny et al. ............. | 717/128 |
| 7,069,543 B2 * | 6/2006 | Boucher ........................ | 717/127 |
| 7,280,955 B2 * | 10/2007 | Martin ............................ | 703/23 |
| 7,346,895 B2 * | 3/2008 | Yang ............................. | 717/128 |
| 7,363,617 B2 * | 4/2008 | Barsness et al. ............. | 717/129 |
| 7,421,684 B2 * | 9/2008 | Dimpsey et al. ............. | 717/131 |
| 7,810,075 B2 * | 10/2010 | Dostert et al. ................ | 717/128 |
| 8,312,435 B2 * | 11/2012 | Wygodny et al. ............. | 717/130 |
| 2002/0007363 A1 | 1/2002 | Vaitzblit | |
| 2002/0173911 A1 * | 11/2002 | Brunet et al. ..................... | 702/1 |
| 2002/0178146 A1 | 11/2002 | Akella et al. | |
| 2005/0010572 A1 | 1/2005 | Clark et al. | |
| 2005/0066194 A1 | 3/2005 | Campbell et al. | |
| 2005/0125445 A1 | 6/2005 | Cotner | |
| 2006/0075306 A1 * | 4/2006 | Chandrasekaran ............. | 714/38 |

OTHER PUBLICATIONS

Downey, "C++ Course", Dec. 5, 2005, http://www.vias.org/cppcourse/chap20_05.html.*
Kavitha et al, "Dynamic coupling measurement of object oriented software using trace events", IEEE, pp. 255-259, 2008.*
Mega et al, "Debugging distributed object applications with eclipse platform", ACM OOPSLA, pp. 42-46, 2004.*
Wang et al, "Dynamic slicing on Java bytecode traces", ACM Trans. on Prog. Lang. and Sys. vol. 30, No. 2 article 10, pp. 1-49, 2008.*
Zhang et al, "Dynamic slicing long running programs through execution fast forwarding" ACM SIGSOFT, pp. 81-91, 2006.*

* cited by examiner

*Primary Examiner* — Anil Khatri
(74) *Attorney, Agent, or Firm* — Baker Botts, L.L.P.

(57) ABSTRACT

According to one embodiment, a method for storing trace events in a database table includes reading a group of parameters from the table. The group of parameters includes parameters indicative of the maximum number of records, the most recently added record, and the total number of records in the table. The method further includes receiving a trace event. The method also includes storing the trace event as a record in the table based on the group of parameters. The method further includes updating the group of parameters before receiving the next trace event.

17 Claims, 4 Drawing Sheets

METHOD AND SYSTEM FOR STORING TRACE EVENTS IN A DATABASE TABLE

TECHNICAL FIELD OF THE INVENTION

The present invention relates generally to trace events, and more particularly to a method and system for storing trace events in a database table.

BACKGROUND OF THE INVENTION

The growing reliance on computers to manage information makes optimizing computers increasingly important. Certain software problems occur infrequently and on an unpredictable schedule. It is often desirable to diagnose these types of problems by storing one or more software events, also referred to as trace events, containing diagnostic data.

The vast amount of trace event information is usually not needed to diagnose a problem. Typically, only the trace event information generated just before and just after the problem is sufficient. Therefore, tracing sessions need to be started and left on until the problem occurs. This approach often suffers from side-effects. Many trace events produce a very large amount of information. So leaving these sessions on can cause system problems, such as filling all available space on the system.

Overview of Example Embodiments

According to one embodiment, a method for storing trace events in a database table includes reading a group of parameters from the table. The group of parameters includes values indicative of the maximum number of records, the most recently added record, and the total number of records in the table. The method further includes receiving a trace event. The method also includes storing the trace event as a record in the table based on the group of parameters. The method further includes updating the group of parameters before receiving the next trace event.

Technical advantages of particular embodiments of the present invention include a method and system for storing trace events in a database table that allows for a trace session to be turned on and kept on. Thus, only the most recent trace event information is stored, and the older trace events are automatically discarded.

Another technical advantage of particular embodiments of the present invention includes a method and system for storing trace events in a database table that allows changing the size the table. Accordingly, updates to the size of the table are made in approximately real-time, as a user changes the table parameters.

Yet another technical advantage of particular embodiments of the present invention includes a method and system for storing trace events in a database table that accommodates storing trace events with standardized I/O routines. Accordingly, the database table may store trace events from various different software applications without specialized I/O routines for each application.

Still another technical advantage of particular embodiments of the present invention includes a method and system for storing trace events in a database table that accommodates storing trace event information in a separate repository. Thus, even if the application fails or is restarted, the trace event information is not lost.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Figure 1A:
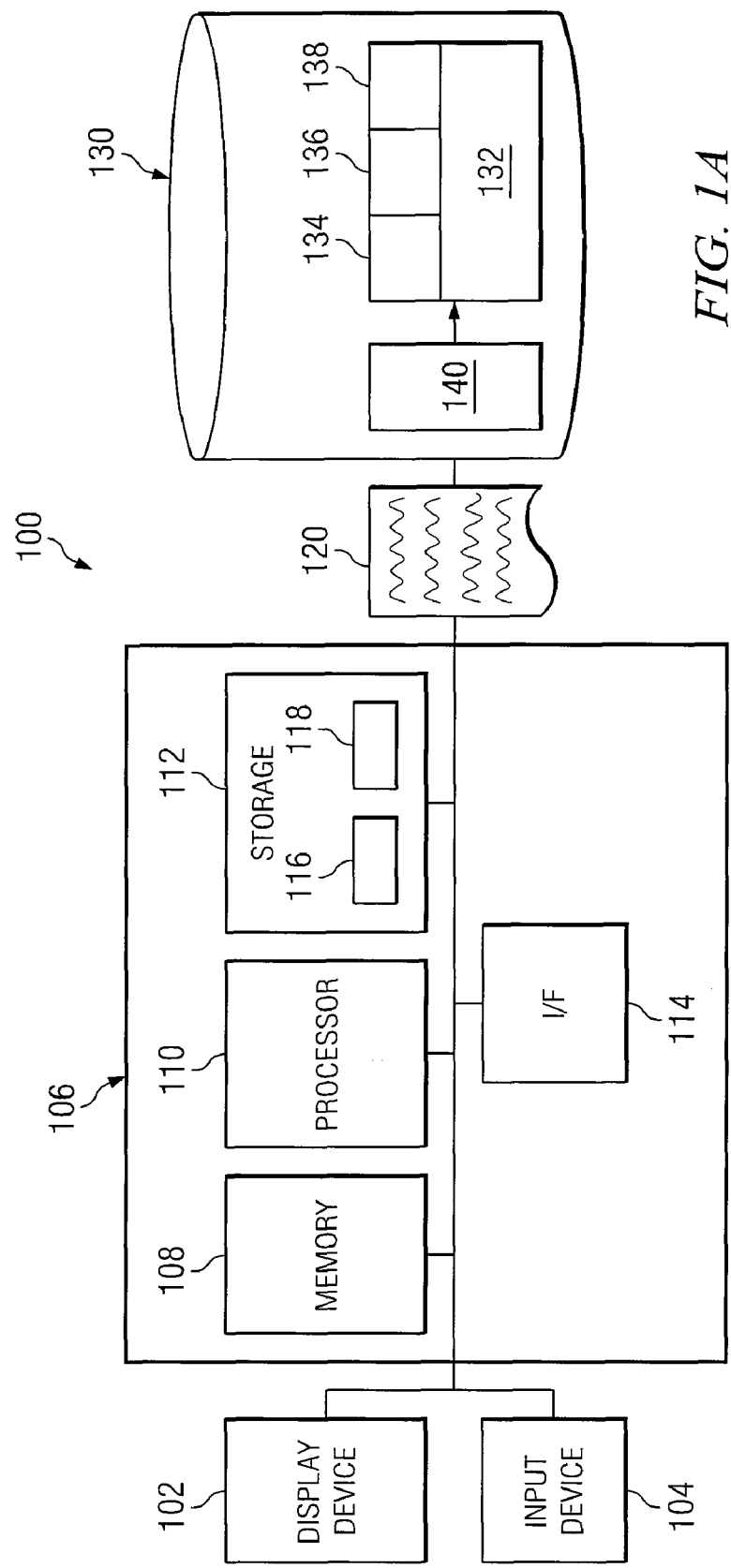
FIG. 1A illustrates a system that incorporates aspects of the present invention.

FIG. 1A illustrates one embodiment of a trace event recording system 100 for storing trace events in a database table according to the teachings of the present invention. As used in this document, the term "trace event" refers to any suitable data generated by software containing diagnostic information. As shown in FIG. 1A, trace event recording system 100 generally includes a display device 102, an input device 104, a computer system 106, a trace event 120, and a database 130 including database table 132. Computer system 106 includes a memory device 108, a processor 110, a storage device 112, a communication interface 114, a software application 116 and a trace task 118 stored in storage device 112. Trace event recording system 100 is particularly adapted for storing a series of trace events 120 from software application 116 into database table 132.

Input device 104 may refer to any device suitable to input, select, and/or manipulate various data and information. Input device 104 may include, for example, a keyboard, mouse, graphics tablet, joystick, light pen, microphone, scanner, or other suitable input device. Display device 102 may be any suitable device for displaying information to a user. Display device 102 may include, for example, a video display, a printer, a plotter, or other suitable output device.

Computer system 106 may execute with any of the well-known MS-DOS, PC-DOS, OS-2, MAC-OS, WINDOWS™, UNIX, or other appropriate operating systems, including future operating systems. Computer system 106 may communicate with other devices, such as database 130, using communication interface 114. Communication interface 114 may include appropriate hardware (e.g. modem, network interface card, etc.) and software, including protocol conversion and data processing capabilities, to communicate through a LAN, WAN, or other communication system that allows computer system 106 to communicate to other devices.

In the illustrated embodiment, database 130 resides separately from computer system 106. In other embodiments database 130 may reside within computer system 106. For example, database 130 may be stored within memory 108 or storage device 112 of computer system 106.

Database 130 stores data, and facilitates addition, modification, and retrieval of such data. In accordance with a particular embodiment of the present invention, database 130 may utilize a relational database management system to store data, making data available and accessible through an easy to use, well understood access language, such as Structured Query Language (SQL). This provides the database 130 with ease of data access, a high degree of reliability, availability, scalability, good performance and cluster support. In other embodiments, database 130 may utilize other data management systems.

In accordance with another embodiment of the present invention, database 130 may store data in American Standard Code for Information Interchange (ASCII), Unicode, or other character encoding formats. This facilitates standard I/O routine compatibility without having to build specialized I/O routines. In other embodiments, database 130 may utilize other data storage formats.

According to one embodiment of the invention, database 130 includes database table 132 for storing trace event information. Database table 132 may store trace event 120. Trace event 120 may include date/time information, trace event type, trace event text, and a myriad of other data associated with trace event 120.

According to one embodiment of the invention, software application 116 resides on computer system 106 and logs trace event 120 to database 130 through trace task 118. Software application 116 and trace task 118 refer, in one embodiment, to computer programs implemented in a suitable computer language such as C, C++, Java, or any other appropriate development language. In the illustrated embodiment, software application 116 and trace task 118 reside in storage device 112. In other embodiments, trace task 118 may be a part of software application 116. That is, trace task 118 may be a separately running thread of software application 116. In various embodiments, trace task 118 may interface with database 130 residing on any number of computers. Additionally, trace task 118 and database 130 may reside on the same computer. Additional details associated with operation of software application 116 and trace task 118 are discussed in greater detail below in conjunction with portions of FIG. 1A, FIG. 1B, and FIG. 2.

According to one embodiment of the invention, a system and method are provided to allow software application 116 to start a tracing session and leave it in operation, without filling all available space in database 130. This is effected by storing only recent trace events, and automatically discarding older trace events.

According to the embodiment, database table 132 includes a parameter indicative of the maximum number of records in the table 134, a parameter indicative of the most recently added record in the table 136, and a parameter indicative of the total number of records in the table 138. The parameters 134, 136, and 138 may be stored in row zero or the first readable row of database table 132. In other embodiments, the parameters 134, 136, and 138 may reside in another database table in database 130, or on another storage device such as storage device 112.

Figure 1B:
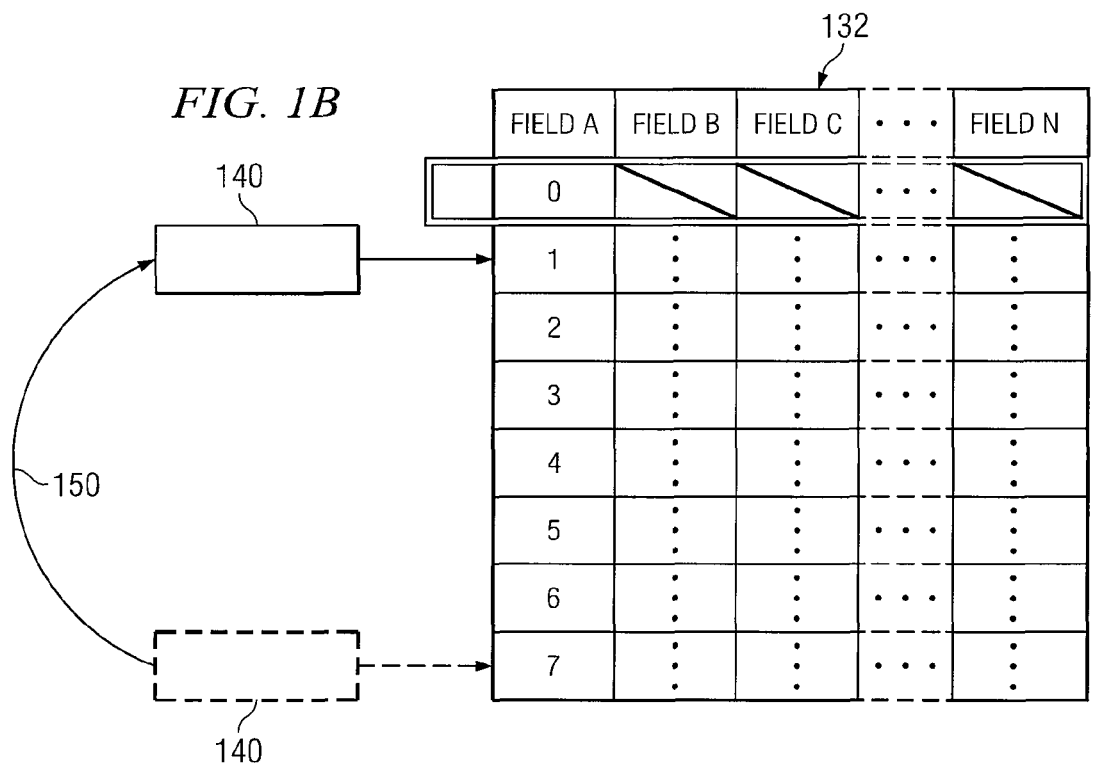
FIG. 1B is an example of a standard database table for storing trace events.

In operation, software application 116 initiates a tracing session with trace task 118. Trace task 118 receives trace event 120 from software application 116, and trace task 118 interfaces with database 130 to store trace event 120 in database table 132. Trace task 118 operates by incrementing the parameter indicative of the most recently added record 136 to generate a current record 140. When current record 140 is greater than the parameter indicative of the maximum number of records 134, current record 140 wraps to the first writable record of database table 132 as in FIG. 1B. As shown in FIG. 1B, current record pointer 140 is reset to the first writable record of database table 132 as indicated by index 150. FIG. 1B is a simplified representation of database table 132, but it is sufficient for purposes of illustration.

When current record 140 is less than the parameter indicative of the total number of records 138, trace task 118 replaces the record stored at current record 140 with data from trace event 120. Otherwise, when current record 140 is greater than the parameter indicative of the total number of records 138, trace task 118 adds data from trace event 120 at current record 140. Trace task 118 updates the parameter indicative of the most recently added record 136 and the parameter indicative of the total number of records 138 before receiving the next trace event.

According to one embodiment of the invention, trace task 118 operates to update the parameter indicative of the maximum number of records 134 upon a command by a user. Updating the parameter indicative of the maximum number of records 134 adjusts the size of database table 132 in approximately real-time. Additionally, all records greater than the parameter indicative of the maximum number of records 134 are deleted. For example, setting the maximum number of records from 700 records to 600 records deletes records 601 to 700. As another example, setting the maximum number of records to zero clears all the records in database table 132, and no trace events can be stored.

According to one embodiment of the invention, trace task 118 operates to display a list of records in database table 132 to display device 102, upon a command by the user. The command may limit the list to a selected type of trace information or a selected time range. For example, the user may select the records corresponding to a certain date. Trace task 118 operates to display the selected records in sequence to display device 102. The records will appear in sequence even if the records wrapped inside database table 132.

Figure 2:
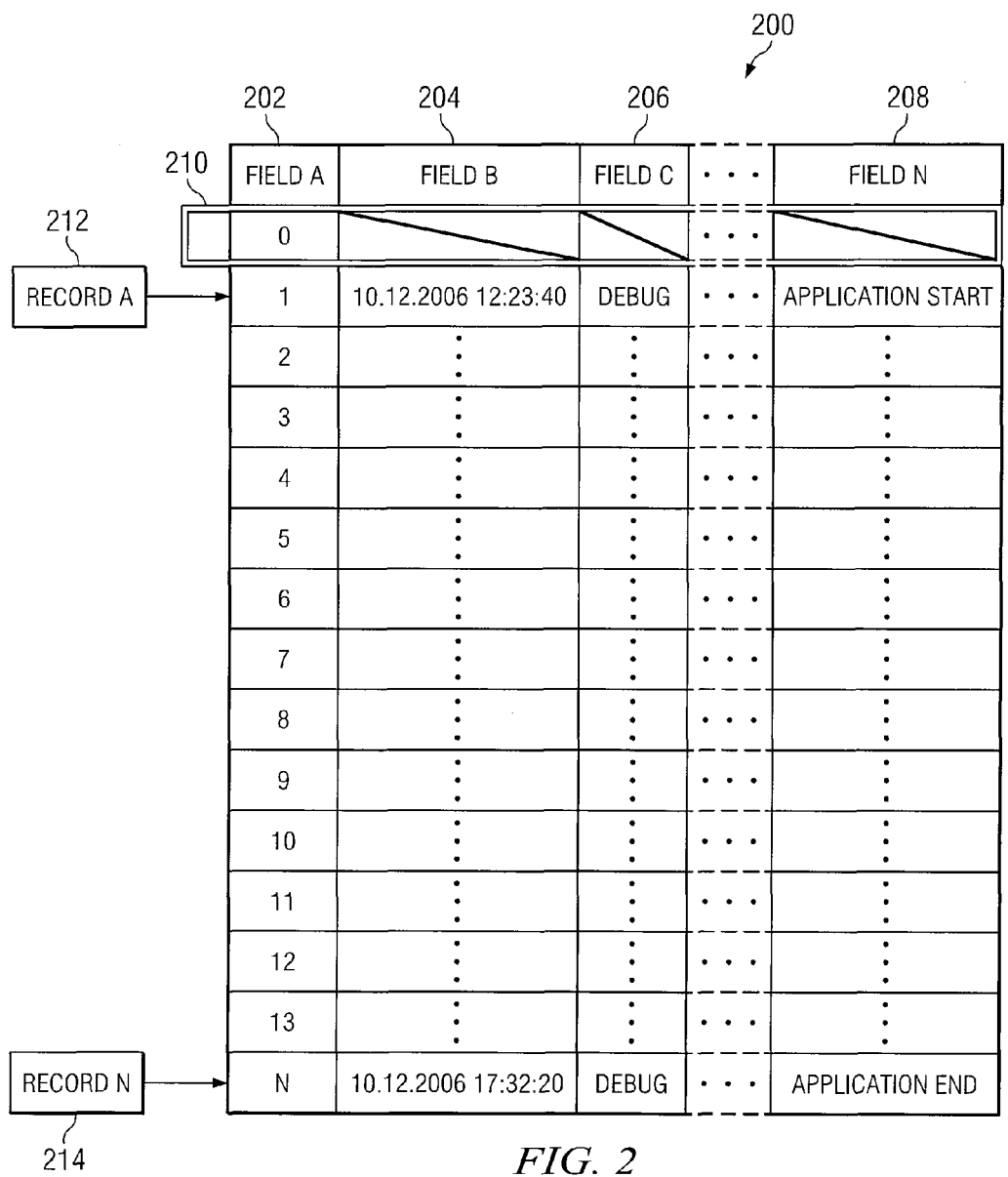
FIG. 2 is an example of a standard database table for storing trace events.

FIG. 2 illustrates a table 200 of trace event information, in accordance with a particular embodiment of the present invention. Table 200 may be substantially similar to database table 132 of FIG. 1A. As described above, a row zero 210 of table 200 is used to store parameters 134, 136, and 138. In a particular embodiment of the present invention, parameters 134, 136, and 138 may reside in a single column, referred to as a field in this disclosure, of row zero 210. For example, parameters 134, 136, and 138 may reside in Field B 204 of row zero 210. In other embodiments, parameters 134, 136, and 138 may reside in multiple fields. For example, parameters 134, 136, and 138 may reside in Field B 204, Field C 206, and Field N 208 respectively.

According to one embodiment of the invention, a row of data, referred to as a record in this disclosure, in table 200 represents a single trace event. For example, a Record A 212 would hold trace event information from trace event 120. Fields 202, 204, 206, and 208 are defined to hold various types of trace event information from Record A 212 to a Record N 214. For example, Field A 202 stores a row number for each record, and may be chronologically sequential with regard to entries made by trace task 118. Field A 202 may be defined to be a primary key for table 200. That is, the row numbers in Field A 202 may uniquely identify the records in table 200.

As another example, Field B 204 stores date/time data for each record. In the illustrated embodiment, Field B 204 stores a date/time entry in the format "DD.MM.YYYY HH:NN:SS" where "DD" refers to day, "MM" refers to month, "YYYY" refers to year, "HH" refers to hour, "NN" refers to minute, and "SS" refers to second. In other embodiments, Field B 204 may store date/time information in other formats.

As another example, Field C 206 stores trace type information for each record. In the illustrated embodiment, Field C 206 stores "Debug" as a particular level of trace event. In other embodiments, Field C may store a particular program name generating the trace events.

As another example, Field N 208 stores trace text from the trace event. In the illustrated embodiment, Field N 208 stores "Application Start" as an informative message indicating an execution state. In other embodiments, Field N 208 may store an error message, such as "Fault at line 236: Invalid SQL Statement" or other similar error message.

Accordingly, the present disclosure contemplates many types of fields to represent software diagnostic trace event data. Various embodiments may include some, all, or none of the enumerated fields. In short, table 200 is defined to hold various types of fields relating to trace event information.

Figure 3:
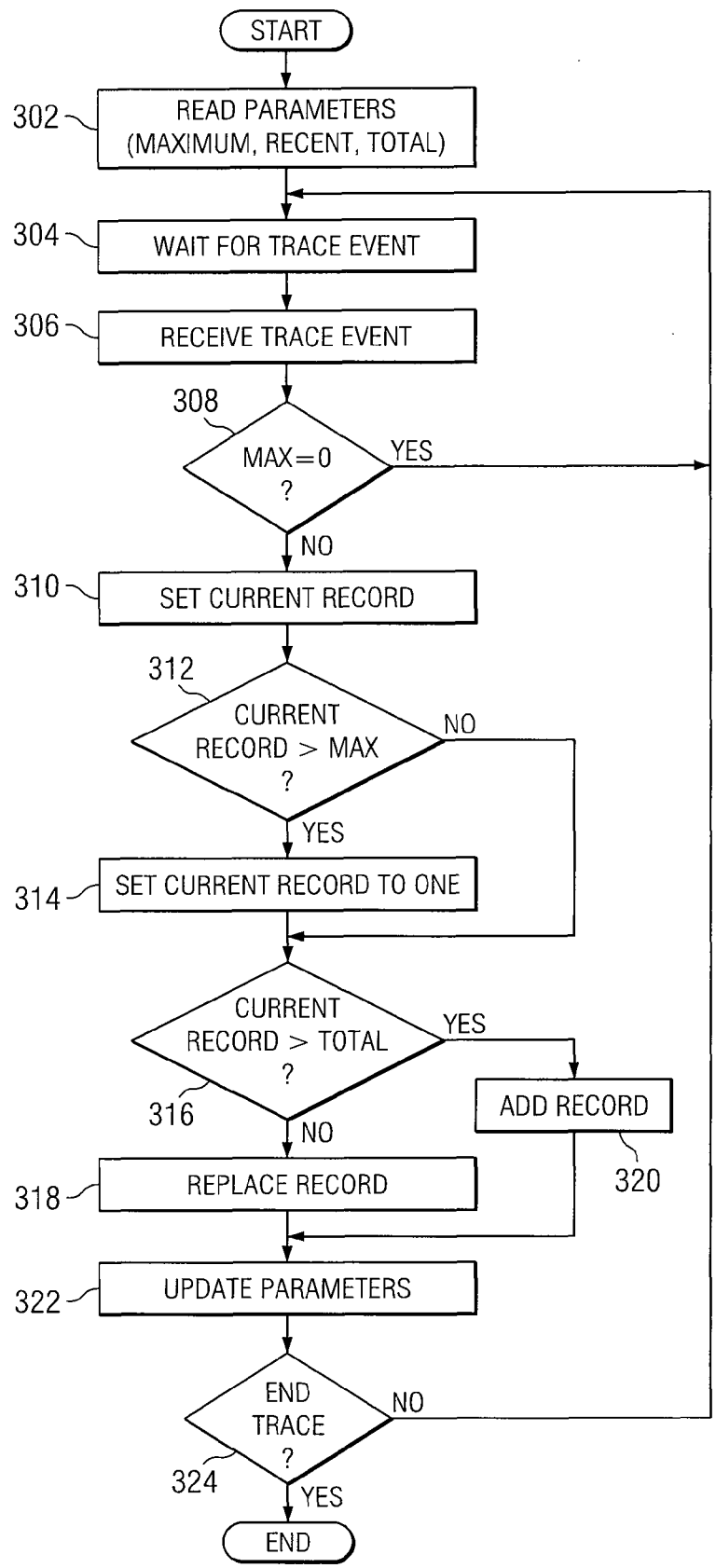
FIG. 3 is a flow diagram for storing trace events in a database table.

FIG. 3 is a flow diagram illustrating example acts associated with storing trace events in a database table. At step 302, a group of parameters is read from the database table. In particular embodiments, the group of parameters may be stored in row zero or the first readable row of the database table. The group of parameters may include values indicative of the maximum number of records, the most recently added record, and the total number of records in the table.

At step 304, the trace event recording system waits for a trace event created by the software application. At step 306, the trace event recording system receives the trace event. At step 308, the trace event recording system determines whether the parameter indicative of the maximum number of records is greater than zero. Where such parameter is greater than zero, a current record is generated based on the group of parameters at step 310. In particular embodiments, the current record is set to one greater than the parameter indicative of the most recently added record.

A determination may be made at step 312 as to whether the current record exceeds the parameter indicative of the maximum number of records. Where the current record exceeds this parameter, the current record wraps to the first writable row of the table at step 314.

Next, a determination may be made at step 316 as to whether the current record exceeds the parameter indicative of the total number of records. Where the current record does not exceed this parameter, the trace event replaces a record at the current record location at step 318. Alternatively, the trace event is added to the table at the current record location at step 320.

At step 322, the parameters are updated in the table to reflect the new trace event added to the table. The method may continue by cycling through steps 304 to 322 for each trace event until the trace session ends, at which time the method terminates.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method for storing trace events in a database table, comprising:
   initiating a tracing session;
   reading a plurality of parameters from the table, the plurality of parameters comprising a parameter indicative of the maximum number of records, a parameter indicative of the most recently added record, and a parameter indicative of the total number of records;
   receiving a first trace event, the first trace event comprising a first condition prior to an error condition;
   generating a record number based on the plurality of parameters;
   storing the first trace event as a record in the table at the record number based on the plurality of parameters, wherein storing the first trace event as a record comprises adding the record to the table at the record number;
   updating the plurality of parameters before receiving a second trace event; and
   receiving the second trace event, the second trace event comprising the error condition;
   after receiving the second trace event, continuing the tracing session;
   displaying a plurality of records corresponding to a selected type of trace information and a selected time range.

2. A method for storing trace events in a database table, comprising:
   initiating a tracing session;
   reading a plurality of parameters from a database table stored in a storage device the plurality of parameters comprising a parameter indicative of the maximum number of records in the table, a parameter indicative of the most recently added record in the table, and a parameter indicative of the total number of records in the table;
   receiving a first trace event, the first trace event comprising a first condition prior to an error condition;
   storing the first trace event as a record in the table based on the plurality of parameters, wherein storing the first trace event as a record comprises:
      generating a record number based on the parameter indicative of the most recently added record in the table; and
      adding the record to the table at the record number;
   updating the plurality of parameters using a processor before receiving a second trace event;
   receiving the second trace event, the second trace event comprising the error condition; and
   after receiving the second trace event, continuing the tracing session.

3. The method of claim 2, wherein storing the first trace event as a record further comprises:
   generating a record number based on the parameter indicative of the maximum number of records in the table and the parameter indicative of the most recently added record in the table; and
   replacing an existing record with the record at the record number.

4. The method of claim 2, further comprising resizing the table by updating the parameter indicative of the maximum number of records in the table.

5. The method of claim 2, further comprising displaying a plurality of records corresponding to a selected type of trace information and a selected time range.

6. The method of claim 2, further comprising clearing the table by updating the parameter indicative of the maximum number of records in the table.

7. The method of claim 2, wherein the database table comprises a relational database table with standardized I/O routines.

8. A computer system, comprising:
   a processor; and
   a storage device readable by the computer system, embodying a program of instructions executable by the processor to perform method steps for storing trace events in a database table, the method steps comprising:
   initiating a tracing session;

reading a plurality of parameters from the table, the plurality of parameters comprising a parameter indicative of the maximum number of records in the table, a parameter indicative of the most recently added record in the table, and a parameter indicative of the total number of records in the table;

receiving a first trace event, the first trace event comprising a first condition prior to an error condition;

storing the first trace event as a record in the table based on the plurality of parameters, wherein storing the first trace event as a record comprises:

generating a record number based on the parameter indicative of the most recently added record in the table; and adding the record to the table at the record number;

updating the plurality of parameters before receiving a second trace event;

receiving the second trace event, the second trace event comprising the error condition; and after receiving the second trace event, continuing the tracing session.

9. The computer system of claim 8, wherein the step of storing the first trace event as a record in the table further comprises:

generating a record number based on the parameter indicative of the maximum number of records in the table and the parameter indicative of the most recently added record in the table; and replacing an existing record with the record at the record number.

10. The computer system of claim 8, wherein the method steps further comprise resizing the table by updating the parameter indicative of the maximum number of records in the table.

11. The computer system of claim 8, wherein the method steps further comprise displaying a plurality of records corresponding to a selected type of trace information and a selected time range.

12. The computer system of claim 8, wherein the method steps further comprise clearing the table by updating the parameter indicative of the maximum number of records in the table.

13. A non-transitory computer readable medium comprising logic, the logic, when executed by a processor, operable to:

initiate a tracing session;

read a plurality of parameters from a table, the plurality of parameters comprising a parameter indicative of the maximum number of records in the table, a parameter indicative of the most recently added record in the table, and a parameter indicative of the total number of records in the table;

receive a first trace event, the first trace event comprising a first condition prior to an error condition;

store the first trace event as a record in the table based on the plurality of parameters, wherein storing the first trace event as a record comprises:

generating a record number based on the parameter indicative of the most recently added record in the table; and adding the record to the table at the record number;

update the plurality of parameters before receiving a second trace event;

receive the second trace event, the second trace event comprising the error condition; and after receiving the second trace event, continue the tracing session.

14. The computer readable medium of claim 13, wherein the operable to store the first trace event as a record in the table is further the logic operable to:

generate a record number based on the parameter indicative of the maximum number of records in the table and the parameter indicative of the most recently added record in the table; and replace an existing record with the record at the record number.

15. The computer readable medium of claim 13, the logic further operable to resize the table by updating the parameter indicative of the maximum number of records in the table.

16. The computer readable medium of claim 13, the logic further operable to display a plurality of records corresponding to a selected type of trace information and a selected time range.

17. The logic computer readable medium of claim 13, the logic further operable to clear the table by updating the parameter indicative of the maximum number of records in the table.

* * * * *